United States Patent
Oke et al.

[15] 3,647,039
[45] Mar. 7, 1972

[54] APPARATUS FOR STOPPING A ROTATABLY DRIVEN MACHINE AT A PREDETERMINED POSITION

[72] Inventors: Syoichi Oke; Takanori Kobayashi, both of Nagoya, Japan

[73] Assignee: Mitsubishi Electric Corporation, Tokyo, Japan

[22] Filed: June 29, 1970

[21] Appl. No.: 50,820

[30] Foreign Application Priority Data

July 10, 1969 Japan.................................44/54758

[52] U.S. Cl.............................192/146, 192/18 B, 192/147, 112/219 A
[51] Int. Cl. ....................................F16d 71/02, D05b 69/26
[58] Field of Search ..............192/18 B, 146, 147; 112/219 A

[56] References Cited

UNITED STATES PATENTS

| 3,358,629 | 12/1967 | Bono | 112/219 A |
| 3,157,261 | 11/1964 | Bono | 192/146 X |
| 3,352,396 | 11/1967 | Moseley | 192/147 UX |

Primary Examiner—Allan D. Hermann
Attorney—Oblon, Fisher and Spivak

[57] ABSTRACT

A rotatably driven sewing machine is enabled to be stopped at a predetermined position through the use of a pilot generator which detects the speed of rotation of the machine and a position detecting device. The pilot generator includes a rotor and stator each of which have a plurality of magnetic poles. The position detecting device includes an auxiliary shaft which is connected directly to the main shaft of the machine and an annular segment thereon which includes an electrical conductor and insulating members. A plurality of brushes make contact with the annular segment and will contact the insulating members when the center of the magnetic poles of the rotor of the pilot generator are aligned with that of the stator.

5 Claims, 6 Drawing Figures

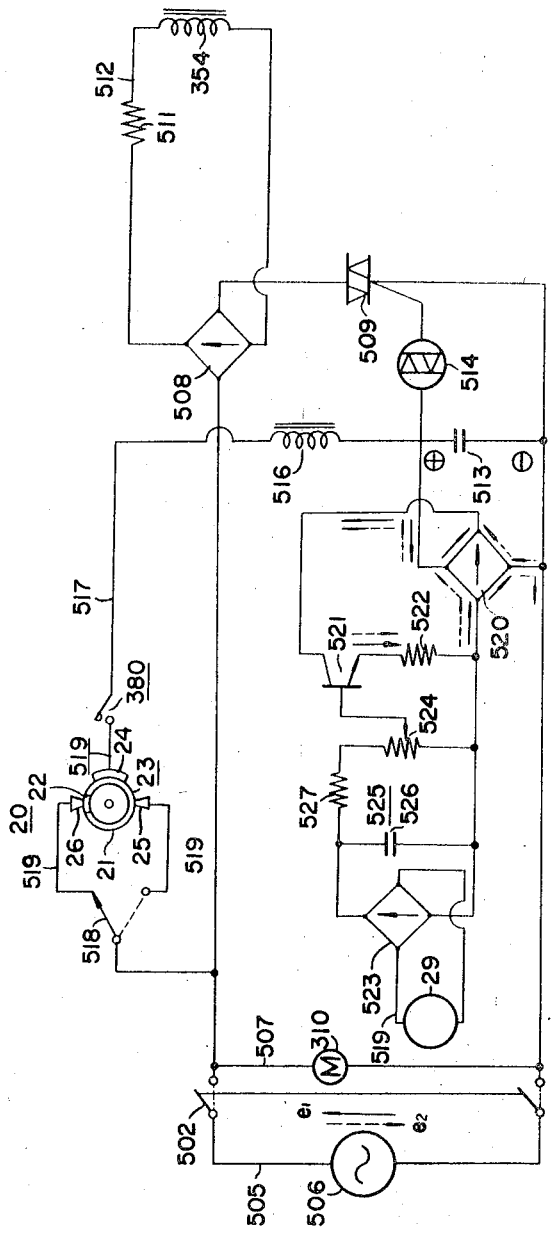

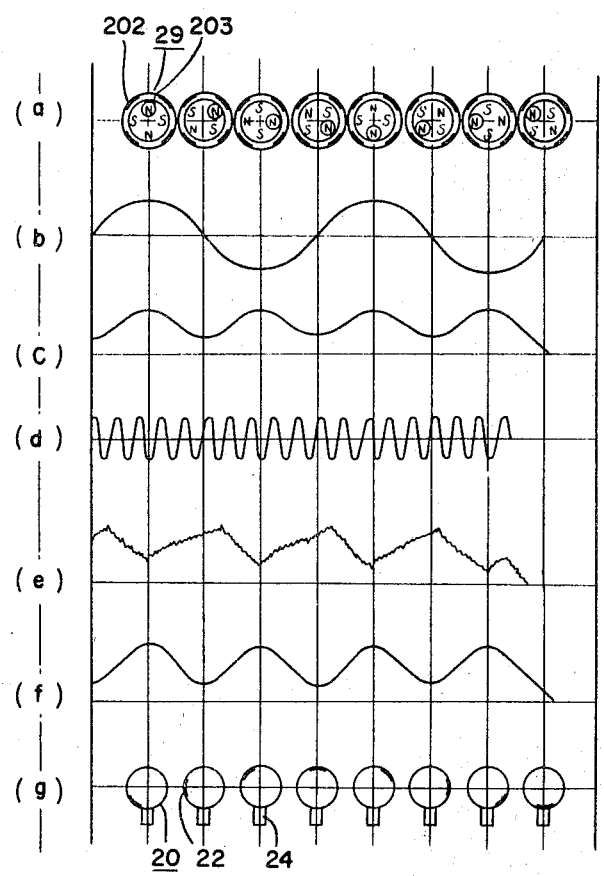

3,647,039

APPARATUS FOR STOPPING A ROTATABLY DRIVEN MACHINE AT A PREDETERMINED POSITION

BACKGROUND OF THE INVENTION

1. Field of the Invention

This invention relates generally to an apparatus for stopping a rotatably driven machine at a predetermined position, and more particularly to an apparatus for stopping a rotatably driven machine at a predetermined position wherein the position for detecting the predetermined position is synchronized with the period of change in speed of the machine under a low speed rotation-driving such that the machine can be stopped at the predetermined position at any time.

2. Description of the Prior Art

In the field of rotatably driven machines, such for example as sewing machines, which are coupled through a clutch and a brake to a rotation-driving source, it is very important to be capable of stopping the machine at a predetermined position.

According to prior art apparatus of this kind, in order to stop a machine which is running at a high speed at a predetermined position, the machine was first decelerated to a low speed and while maintained at the low speed, the stopping position was detected during the low speed driving. Thus, in the past in order to stop a rotatably driven machine the same had to be maintained at such a low speed driving condition that the speed of the machine would periodically change about a predetermined low value of speed. Then, by detecting the speed of the machine and controlling the clutch and brake coupling, the machine with the rotatably driving source could by means of a detection factor, then be braked for stopping during the low speed driving.

While somewhat satisfactory, with the prior art apparatus, since the speed of the machine to be stopped would periodically change within a range about a predetermined low value of rotation speed, the detection of the stopping position would be effected depending upon whether the machine was at the maximum speed or minimum speed. Thus, the time required for the effective stopping of the machine when at a maximum speed will be different, though slightly, from that for effecting stopping when the machine is at minimum speed. For this reason, the position at which the machine is finally stopped will be different depending upon the speed at the time of stopping. Accordingly a disadvantage in the prior art is that the accuracy of a desired stopping position is limited by speed variations. Moreover, if the machine stopping position is detected when the machine is at a maximum speed the brake will be burdened thereby.

SUMMARY OF THE INVENTION

Accordingly, it is one object of this invention to provide a new and improved apparatus for stopping the rotating member of a driven machine at a predetermined position.

Another object of this invention is to provide a new and improved unique apparatus for stopping the rotating member of a driven machine at a predetermined position with a high degree of accuracy and which is both compact and inexpensive.

Yet another object of this invention is to provide a new and improved apparatus for stopping a machine at a predetermined position by utilizing a speed determining device which when the center of the magnetic poles of a rotor thereof is aligned with the stator thereof will be at the predetermined position.

Briefly, in accordance with this invention the foregoing and other objects are in one aspect attained by the use of a pilot generator which has a rotor and a stator each of which has a plurality of magnetic poles for detecting the speed of a rotatably driven machine in combination with a position detecting device which rotates simultaneously with the rotatably driven machine and which provides the predetermined stopping position such that when the center of the magnetic poles of the rotor of the pilot generator are aligned with the stator thereof the predetermined position will be established by the position detecting device.

BRIEF DESCRIPTION OF THE DRAWINGS

A more complete appreciation of the invention will be readily obtained as the same becomes better understood by reference to the following detailed description when considered in connection with the accompanying drawings wherein:

FIG. 5 is a schematic diagram of an electric controlling device suitable for use in the embodiment of FIG. 1; and FIG. 6 is a plurality of graphs which illustrate various relationships with respect to time of the apparatus of the present invention.

DETAILED DESCRIPTION OF THE PREFERRED EMBODIMENT

Figure 1:
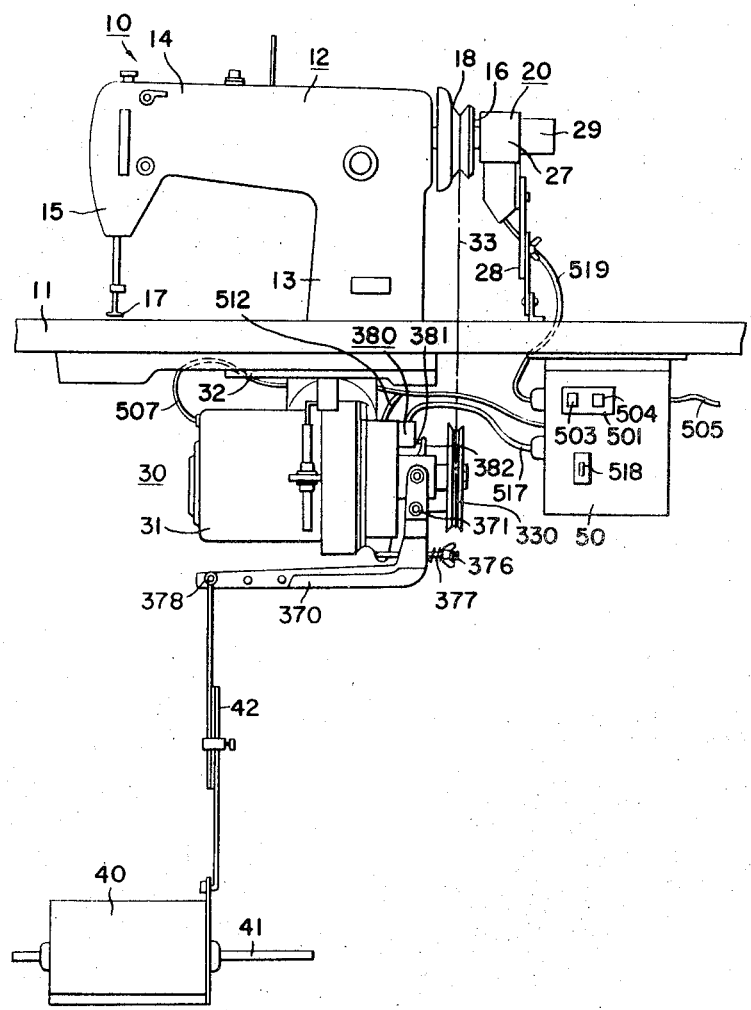
FIG. 1 is a view illustrating an exemplary sewing machine in conjunction with the apparatus of the present invention which enables the machine to be stopped at a predetermined position.

Referring now to the drawings wherein like reference numerals designate identical, or corresponding parts throughout the several views, and more particularly to FIG. 1 thereof wherein a sewing machine 10 is shown as including a working table 11 and a machine body 12 which is mounted on the top surface of the table 11. The machine body 12 has a base portion 13 which extends in a vertical direction from the table 11, a drum portion 14 which extends in a substantially horizontal direction from the top end of the base portion 13 and a head portion 15 which is provided at the end of the drum portion 14. A main shaft 16 extends through the drum portion 14 and is used for enabling a sewing needle 17 to move up and down through an eccentric cam mechanism (not shown) which is provided within the head portion 15. A pulley 18 is fixed to the main shaft 16. A device 20 is provided for detecting the position of the sewing needle 17 and the same is coupled to the main shaft 16. The position detecting device 20 is shown and described in detail hereinafter with reference to FIG. 2.

Figure 2:
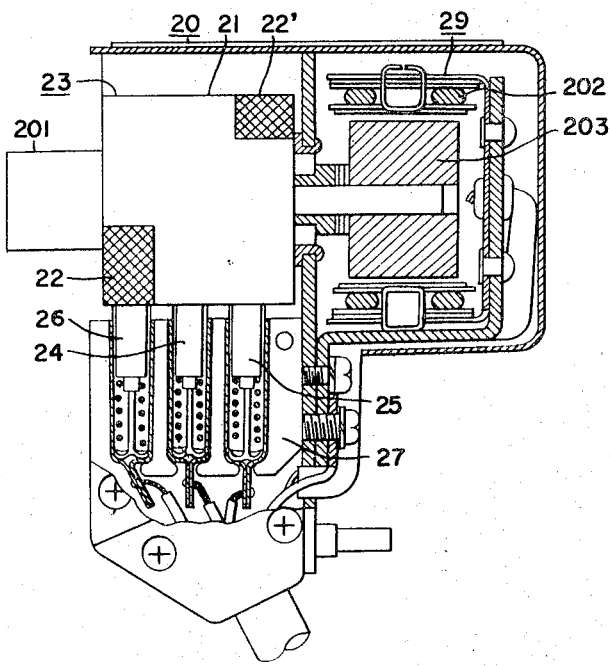
FIG. 2 is a view illustrating in detail a position detecting device suitable for use in the embodiment of FIG. 1.

Referring now to FIG. 2, an auxiliary shaft 201 is shown and the same is connected directly to the main shaft 16 and an annular segment 23 which consists of an electric conductor 21 dispersed on the peripheral surface of the auxiliary shaft 201 and insulating members 22 and 22' provided at portions along the segment. First, second and third brushes 24, 25 and 26 are respectively provided in sliding contact with the annular segment 23. The first brush 26 is arranged to make contact with the insulating member 22 of the annular segment 23 when the sewing needle 17 is in a predetermined position, such for example as the top position within its stroke of motion. The second brush 25 is arranged to make contact with the insulating member 22' when the sewing needle 17 is in another predetermined position, such for example as the bottom position within its stroke of motion. The third brush 24 is arranged to always make contact with the electrical conductor 21. A casing 27 is provided for supporting the brushes 24, 25 and 26. A plate 28 (see FIG. 1) is provided for supporting and connecting the casing 27 to the table 11. A pilot generator 29 is provided for producing an alternating voltage proportional to the speed of rotation of the main shaft 16. As shown in FIG. 2, the pilot generator 29 comprises a stator 202 enclosed by the casing 27 and a rotor 203 which is coupled to the auxiliary shaft 201.

Figure 3:
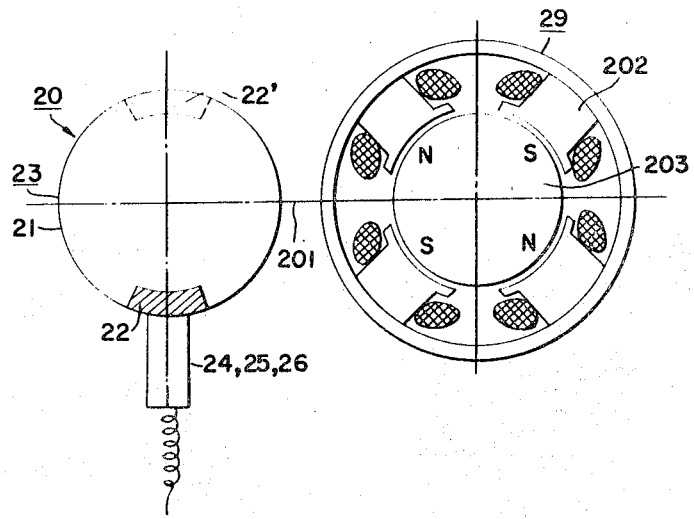
FIG. 3 is a view illustrating in detail how the brushes within the position detecting device of FIG. 2 make contact with an annular segment therein.

Furthermore, as clearly shown in FIG. 3, the first and second brushes 26 and 25 are arranged to respectively make contact with the insulating members 22 and 22' of the annular segment 23 of the detecting device 20 when the center of the magnetic poles N,S of the rotor 203 coincides with the magnetic poles of the stator 202.

Referring again to FIG. 1, a driving and controlling device 30 is shown as being provided beneath the table 11. The driving and controlling device 30 is provided within a housing 31 and is connected beneath the table 11 by a mounting plate 32.

Figure 4:
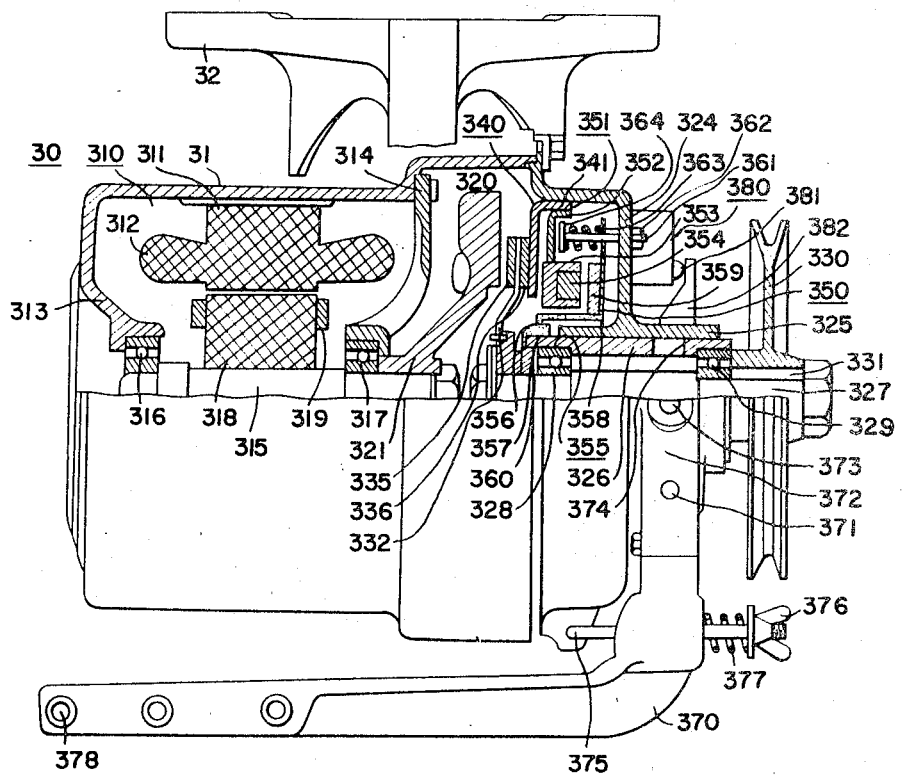
FIG. 4 is a view illustrating in detail a driving and controlling device suitable for use in the embodiment of FIG. 1.

The driving and controlling device 30 is shown and described in detail with reference to FIG. 4. In FIG. 4, a motor 310 is used as a rotation-driving source. An iron core 311 which forms a part of the stator of the motor 310 is shown as being fixed to the inside periphery of the above-mentioned housing 31. A stator coil 312 is shown connected to the iron core 311. A left side bracket 313 is provided at the left end of the housing 31 and a middle bracket 314 is provided at the center portion of the housing 31. A rotating shaft 315 of the motor 310 is supported through ball bearings 316 and 317 on the brackets 313 and 314. A rotor iron core 318 is provided and fixed to the rotating shaft 315 and supports a rotor coil 319.

A clutch device 320 is provided. A rotating body 321 of the clutch device 320 is provided and is mounted on the right end of the rotating shaft 315. A right-side bracket 324 is provided at the right end of the housing 31. A sleeve bearing 325 is provided at the center portion of the right-side bracket. A movable sleeve bearing 326 is provided and inserted into the central opening of the sleeve bearing 325 and the same may therefore rotate and axially move therein. An output shaft 327 is supported through ball bearings 328 and 329 on the inside periphery of the movable sleeve bearing 326 and is arranged to be coaxial with the rotating shaft 315.

A pulley 330 is fixed to the right end of the output shaft 327 by a key 331. The pulley 330 is connected to the pulley 18 through a belt 33 as shown by the broken line in FIG. 1. A rotating body 332 of the clutch device 320 is provided and is fixed to the left end of the output shaft 327. Annular friction plates 335 and 336 are fixed to both sides of the rotating body 332. The friction plate 335 is positioned opposite to the rotating body 321.

A stationary plate 341 of a brake device 340 is provided and is in the form of a ring and fixed to the inside periphery of the right-side bracket 324. The plate 341 is positioned opposite to the friction plate 336 and serves as the stator of the brake device 340.

An electromagneto device 350 is provided and serves to control both the clutch 320 and the brake 340. The stator 351 of the electromagneto device comprises an annular supporting plate 352 fixed on the stationary plate 341, an annular iron core 353 of a C-type cross section to the inside periphery of the supporting plate 352 and an electromagnetic coil 354 is wound on the annular iron core 353. The movable element 355 of the electromagneto device 350 comprises an annular movable plate 358 loosely fitted onto the periphery of the left end of the movable bearing 326 and positioned between stops 356 and 357 and an annular moving iron core 359 which is fixed onto an axially extending face of the movable plate 358 and positioned opposite to the annular iron core 353.

A guide ring 360 is provided and fixed on the outside periphery of the sleeve bearing 325 and makes contact with the inside periphery of the sleeve portion of the movable plate 358 to guide the movement thereof. A plurality of screw rods 361 are arranged to pass through the movable plate 358 at peripheral portions thereof. Nuts 362 are provided and screwed into that part of the screw rods 361 which projects from the right-side bracket 324. Coil springs 363 are provided and are arranged between flanges 364 at the inner side of the screw-rods 361 and the movable plate 358. The coil springs 363 serve to apply forces opposite to that of the attracting force of the moving iron core 359 to the moving plate 358 which is caused by the electromagnetic coil 354 such that the rotating body 332 is detached from the rotating body 321 and then moved toward the stationary plate 341. An L-type operating lever 370 is pivotally mounted on the right-side bracket 324 by a pin 371. The lever 370 is provided with a forked part 372 at one end thereof. The forked part 372 is adapted to hold the sleeve bearing 325 between the legs thereof. A bolt 373 is provided at the end of the forked part 372 and is fitted to the elongated aperture 374 of the movable bearing 326 to enable the movable bearing 326 to be moved in an axial direction. A screw rod 375 is provided and is supported at one end by the right-side bracket 324. The screw rod 375 passes through the lever 370 at a portion thereof which extends below the pin 371. A nut 376 is screwed into the other end of the screw rod 375. A coil spring 377 is arranged between the nut 376 and the lever 370 and serves to bias the movable bearing 326 toward the right side so that the rotating body 332 is disconnected from the rotating body 321. A microswitch 380 is provided and is fixed to the outer side of the upper portion of the right-side bracket 324. An actuating element 381 is provided for the microswitch 380. An operating member 382 is provided at one of the legs of the forked part 372 and projects therefrom so as to engage with the actuating element 381. Thus, when the lever 370 is rotated in a counterclockwise direction about the pin 371 and the spring 377 become biased, the rotating body 332 will be applied against the rotating body 321 with a sufficient force so that the operating member 382 will depress the actuating element 381 and thereby open the microswitch 380.

Referring again to FIG. 1, it is seen that a pedal 40 of the sewing machine is provided which is capable of rotating about a shaft 41. A connecting bar 42 connects an aperture 378 at the end of the lever 370 to the pedal 40. An electric controlling device 50 is provided and is mounted beneath the table 11. The electric power source operating board 501 of the controlling device 50 has two push buttons 503 and 504 for switching a power source switch.

The details of the electric controlling device 50 can best be understood with reference to FIG. 5 wherein a lead 505 is shown as connecting the power source switch 502 to an AC power source 506 and a lead 507 is shown as connecting the power source switch 502 to a motor 310. A single phase full wave rectifier 508 is provided and a bilateral three-terminal thyristor 509 is connected to the AC input side thereof. A resistor 511 is connected to the DC output side of the rectifier 508 and a lead 512 connects the resistor 511 to the electromagnetic coil 354.

A condenser 513 and a triggering element such for example as a bilateral three-layer diode 514 are provided in the gate circuit of the thyristor 509. When the voltage across the condenser 513 exceeds a predetermined absolute value Vo with the polarity shown in FIG. 5, the three-layer diode 514 will become conductive and turn on the thyristor 509. Similarly, when the voltage across the condenser 513 exceeds the same absolute value Vo with a polarity opposite to that shown in FIG. 5, the three-layer diode 514 will still turn on the thyristor 509. A reactor 516 is provided in series with the condenser 513 and a lead 517 serves to connect the reactor 516 to the microswitch 380. A changeover switch 518 is provided for selecting either the first brush 26 or the second brush 25 of the position detecting device 20 of the sewing machine. If the changeover switch 518 is placed in the upper position, the first brush 26 is selected, while if the switch is placed in the lower position, the second brush 25 is selected. Reference number 519 collectively indicates leads for connecting both the position detecting device 20 and the pilot generator 29 to the electric controlling device 50. The third brush 24 of the position detecting device 20 is connected to the microswitch 380 through one of these leads. Additionally, a single phase full wave rectifier 520 is provided and connected across the condenser 513. An NPN-type transistor 521 is provided and a resistor 522 is connected between the transistor 521 and the rectifier 520. A single phase full wave rectifier 523 is provided and the DC output side thereof is connected to the base and emitter of the transistor 521, while the AC input side thereof is connected to the pilot generator 29. A variable resistor 524 is provided and connected to the base of the transistor 521. A filter circuit 525 which consists of a condenser 526 and a resistor 527 serves to smooth the DC output from the rectifier 523.

The operation of the preferred embodiment of the apparatus of this invention as set forth above can be described as follows. The sewing machine 10 may be turned on by depressing the push button 503 to cause the power source switch 502 to be closed. The motor 310 is thereby energized and thus the rotating shaft 315 is driven. Under this condition, if the pedal 40 is stepped on the connecting bar 42 will be pulled and the lever 370 will be rotated in a counterclockwise direction about the pin 371 against the spring 377. The movable bearing 326 will be moved toward the left side by the bolt 373. The movement of the movable bearing 326 will thereby cause the output shaft 327 together with the ball bearings 328 and 329 to be pushed toward the left side. The friction plate 335 of the rotating body 332 will then be pressed against the rotating body 321 and thereby drive the rotating body 322. The clutch 320 will then operate without causing any substantial slip between the rotating bodies 321 and 332. Thus, the output shaft 327 will be driven at a rotation speed substantially equal to that of the output shaft 315. The main shaft 16 is driven through the pulleys 330 and 18. Accordingly, the sewing needle 17 will be caused to move up and down to enable a sewing operation to be effected. Generally, by way of example, the main shaft 16 may be driven at a speed of 3,000 to 5,000 r.p.m. It should be understood that the rotation of the lever 370 will cause the microswitch 380 to be actuated and thereby open the contact of the microswitch. Under this condition the condenser 513 of FIG. 5 will not be charged. As such, the thyristor 509 will be in the "off" condition and no electric current will flow through the electromagnetic coil 354 of the electromagnetic device 350.

In order to stop the sewing machine 10 the force which has been applied to the pedal 40 will be removed. Under such conditions, rotating body 332 will be moved toward the right side by the spring 363, and the clutch 320 will be released. The friction plate 336 of the rotating body 332 will be pressed on the stationary plate 341 of the brake device 340. Since the clockwise rotation of the lever 370 is prevented after the rotating body 332 is detached from the rotating body 321, the spring 377 will no longer be able to move the rotating body 332 further towards the right side. The spring 363, however, will move the rotating body 332 towards the right side by the resulting clearance between the elongate 374 and the bolt 373. Thus, the main shaft 16 which would continue to rotate by reason of inertia will be braked and as such the rotation speed of the main shaft 16 will rapidly be reduced.

By the returning operation of the lever 370, the contact of the microswitch 380 will now be closed. Now, if it is assumed that the changeover switch 518 has been thrown into the upper position then the first brush 26 of the position detecting device 20 will make contact with the conductor 21 and the series circuit which includes the changeover switch 518, the first brush 24, the conductor 21, and the third brush 26, the microswitch 380, the reactor 516 and the condenser 513 will be completed. However, if the speed of rotation of the main shaft 16 is considerably high then the output voltage from the pilot generator 29 will be above a predetermined level and a base current will flow through the base and emitter of the transistor 521 from the rectifier 523 and will be sufficiently large to make the collector-emitter of the transistor 521 fully conductive. An electric current from the power source 506 of a voltage $e_1$ of the polarity, as shown by solid line arrow in FIG. 5, will flow through a circuit including the transistor 521, the resistor 522 and the rectifier 520. The condenser 513 will be bypassed. Similarly, an electric current from the power source 506 of a voltage $e_2$ of the polarity, as shown by broken line arrow in FIG. 5, will flow through a circuit including the rectifier 520. Again the condenser 513 will be bypassed. Thus, regardless of the polarity of the voltage of the power source 506 the condenser 513 will not be charged to a voltage level sufficient to make the triggering element 514 conductive and as such the thyristor 509 will not be turned on. In turn, the electromagnetic coil 354 of the electromagneto device 350 will not be energized. The friction plate 336 of the rotating body 332 will still be pressed on the stationary plate 341 and the main shaft 16 will continue to be decelerated.

It should be understood that when the speed of rotation of the main shaft 16 is reduced to a predetermined value, the output voltage of the pilot generator 29 will be reduced in proportion thereto. At such time the conductivity of the transistor 521 will change and the resistance between the collector and the emitter of the transistor 521 will increase. This increase in the collector-emitter resistance will lessen the bypassing function of the transistor 521 so that the condenser 513 will be charged to a sufficient voltage to cause the triggering element 514 to conduct. If the polarity of the voltage of the power source 506 is as shown by $e_1$ then the condenser 513 will charge with the polarity as shown in FIG. 5. As soon as the condenser 513 is charged to the predetermined absolute value Vo, the thyristor 509 will be turned on. If the polarity of the voltage of the power source 506 is as shown by $e_2$ then the condenser 513 will charge with a polarity opposite to that shown in FIG. 5. Again, as soon as the condenser 513 is charged to the predetermined absolute value Vo, the thyristor 509 will be turned on. The rectifier 508 will rectify the AC input wave applied thereto in accordance with the firing phase angle of the thyristor 509. The resultant rectified output will then be applied to the electromagnetic coil 354. As the output voltage of the pilot generator 29 is lowered, the resistance of the transistor 521 will increase and the condenser 513 will charge faster so that the thyristor 509 is fired at earlier phase. Under such conditions, the duration of the AC signal as obtained by the thyristor 509 will be longer and thus the electric current flowing through the electromagnetic coil 354 will be increased. When the electric current flowing through the electromagnetic coil 354 is so increased, the force attracting the moving iron core 359 by the annular iron core 353 will exceed that of the springs 363 and the rotating body 332 will be caused to detach from the stationary plate 341 and again make contact with the rotating body 321. The clutch device 320 will again be coupled. However, since in this case the force pressing the friction plate 335 of the rotating body 332 against the rotating body 321 will change in proportion to the electric current flowing through the electromagnetic coil 354 and not be sufficiently strong, the output shaft 327 will be driven with a slip being caused between the rotating body 321 and the friction plate 335. That is, the output shaft 327 will be driven in a so-called semiclutching condition. Because the torque transferred in this semiclutching condition will increase as the speed of rotation of the main shaft 16 is reduced, the main shaft 16 will be continuously driven with the speed of rotation thereof periodically changing about a predetermined low level, such for example as 200 r.p.m.

During the continuous driving condition, the period of time for which the first brush 26 will continue to contact the insulating member 22 will be sufficiently long so as to prevent the condenser 513 from being charged during a rest period of time which is sufficient to cause the electromagnetic coil 354 to become fully deenergized. When the electromagnetic coil 354 is deenergized, the rotating body 332 will again be pressed against the stationary plate 341 for braking. Accordingly, the rotation of the main shaft 16 will stop. The sewing machine 10 can thus be stopped in the position at which the insulating member 22 makes contact with the first brush 26, that is, in the upper position of its moving stroke. The continuous driving condition and the process of stopping can be further described in greater detail hereinafter in conjunction with FIG. 6.

Referring now to FIG. 6, the graph (a) illustrates the relationship between the changing positions of the stator 202 and the rotor 203 of the pilot generator 29 as time elapses. The graph (b) shows the output voltage of the pilot generator 29 plotted against time. The graph (c) shows the base current flowing to the transistor 521 plotted against time. The graph (d) shows the AC signal applied to the rectifier 508 in accordance with the firing phase angle of the thyristor 509. The graph (e) shows the electric current flowing through the electromagnetic coil 354 plotted against time. The graph (f) shows the speed of rotation of the main shaft 16 which is controlled by the current, shown in graph (e), and continuously driven at a predetermined low level. The graph (g) illustrates the relationship between the positions of the insulating member 22 and the first brush 26 of the position detecting device 20. It should be understood that all of the graphs (a) through (g) coincide with each other with respect to the time calibrated along the axis of abscissa.

It is well known that even if the pilot generator 29 is rotated at a constant speed while in the continuous driving condition that the same will produce a sinusoidal AC voltage which will have a zero value upon alignment of the magnetic poles of the stator 202 and the rotor 203 and a maximum value when the magnetic poles of the stator and the rotor differ by an electrical angle of 90°, as shown in graphs (a) and (b). Thus, the base current of the transistor 521 is proportional to the output voltage and is shaped by the filter circuit into a wave form as shown in graph (c). The voltage wave form applied to the rectifier 508 is as shown in graph (d) for the following reason. As mentioned above, when the base current is high, the thyristor 509 will be fired at a later phase while when the base current is low, the thyristor 509 will be fired at an earlier phase. Accordingly, as shown in graph (e), the electric current flowing through the the electromagnetic coil 354 will become lower when the base current is high and become higher when the base current is low. On the other hand, because of delays in response of the components, the speed of rotation of the main shaft 16 will be as shown in graph (f). The main shaft 16 will be continuously driven with the speed of rotation thereof periodically changing about a predetermined value in such a manner that the speed will become high when the base current is high and the speed will become low when the base current is low. In other words, the speed of rotation of the main shaft 16 is at a minimum value when the magnetic poles of the stator 202 and the rotor 203 of the pilot generator 29 are aligned with each other, and will be of a maximum value when the magnetic poles differ by an electrical angle of 90°. In such a manner, the speed of rotation of the main shaft 16 will periodically change.

According to this invention, because the insulating members 22 or 22' of the position detecting device 20 are arranged to contact with the first or second brush 26 or 25 thereof when the center of the magnetic pole of the rotor 203 of the pilot generator is aligned with that of the stator 202 thereof then the contact of the insulating members 22 or 22' with the first or second brush 26 or 25 and thus the stopping at a predetermined position will be effected exactly at the time when the speed of rotation is lower, as shown in graph (g). This enables an easy braking. Thus, it should be apparent that according to this invention machine stoppings are not effected when the machine is at different speeds during the continuous driving condition, as in the past, but will always be effected when the machine is at the same speed. With such a unique advantage it is possible not only to widely improve the reliability and rapidity of stopping of the machine, but also to greatly improve the accuracy of the stopping position.

It should be understood that although this invention has been described with respect to an embodiment wherein a sewing machine is used as a rotatably driven machine and that an electric motor has been used as the rotation-driving source, that the invention is not so limited and may be applied to all other rotatably driven machines which are desired to be stopped at a predetermined position of rotation. Thus, for example, the present invention is equally applicable to riveting machines wherein a hammer is moved up and down through rotatably driving of the same, sawing machines wherein a fret saw is moved up and down through rotatably driving of the same or the like.

It should now be apparent that according to this invention the magnetic poles of a pilot generator are adapted to detect the speed of a machine in order to effect a low speed driving through an automatic semiclutching operation. With the present invention, since machine stopping can always be effected under the same low speed conditions while the low speed rotation-driving is maintained in an oscillating manner, the stopping at a predetermined position can be rapidly and surely effected with the accuracy thereof greatly improved. In a particular application, it has been found that the accuracy of machine stopping in accordance with the teachings of this invention was one and a half times better than that of the prior art.

Moreover it should be apparent that since the magnetic attracting force acting between the stator and the rotor of the pilot generator of this invention at a maximum value when the magnetic poles of the stator and the rotor are aligned with each other and thereby provide a braking force that the accuracy of machine stopping will be further improved by utilization of such braking force.

Obviously, numerous modifications and variations of the present invention are possible in light of the above teachings. It should therefore be understood that within the scope of the appended claims the invention may be practiced otherwise than as specifically described herein.

What is claimed as new and desired to be secured by Letters Patent of the United States is:

1. An apparatus for stopping a rotatably driven machine at a predetermined position comprising:
    a source of power for driving said rotatably driven machine;
    a pilot generator which has a rotor and a stator, each of which has a plurality of magnetic poles for detecting the speed of said rotatably driven machine and for generating a fluctuating voltage causing said rotatably driven machine to be driven at a speed which varies periodically about a predetermined value; and,
    a position detecting device which rotates simultaneously with said rotatably driven machine for determining said predetermined stopping position of said machine in accordance with said periodically varying speed.

2. An apparatus as claimed in claim 1, wherein the predetermined stopping position of said position detecting device is a position such that the center of the magnetic poles of said rotor of said pilot generator is aligned with that of the stator thereof.

3. An apparatus as claimed in claim 2, wherein said rotatably driven machine includes a rotating shaft and wherein said position detecting device further comprises:
    an auxiliary shaft connected to the rotating shaft of said rotatably driven machine;
    an annular segment provided on said auxiliary shaft, the peripheral surface of which includes an electrical conductor and insulating members;
    a plurality of brushes each of which slide-contacts with said annular segment; and
    a housing for supporting said brushes.

4. An apparatus as claimed in claim 3, wherein the rotor of said pilot generator is connected to said auxiliary shaft of said position detecting device and wherein the stator of said pilot generator is positioned opposite to the peripheral surface of said rotor and is supported by said housing.

5. An apparatus as claimed in claim 4, wherein the insulating members of said position detecting device make contact with the brushes thereof when the center of the magnetic poles of the rotor of said pilot generator is aligned with that of the stator thereof.

* * * * *